May 14, 1946. L. SPRARAGEN 2,400,470

BEADING STRIP

Filed March 23, 1942

INVENTOR
Louis Spraragen,
BY
ATTORNEYS

Patented May 14, 1946

2,400,470

UNITED STATES PATENT OFFICE 2,400,470

BEADING STRIP

Louis Spraragen, Bridgeport, Conn., assignor to Bridgeport Fabrics, Inc., Bridgeport, Conn., a corporation of Connecticut Application March 23, 1942, Serial No. 435,782

10 Claims. (Cl. 20—69)

The invention relates to improved beading or sealing strips of a type particularly adapted for exterior seals for closure members.

Heretofore, it has been proposed to cement or otherwise adhere a strip of sponge rubber or the like material about the closure member so as to be located in position to seal an opening when the closure member is moved to closed position. Such devices are often used to seal the doors of automobiles or the like, and are subject to rain and other weather conditions. However, sponge rubber, being porous, retains the moisture, causing rust and the like, and often becomes loosened from its mounting.

In an effort to overcome these difficulties, hollow sealing members were molded from rubber material, since previous covers for the sponge were ineffective due to bunching when the sponge was bent. While these seals were not porous and were sufficiently rigid to be anchored by clips or the like to the door, they were subject to frequent breakdowns due to the flexing of the walls of the hollow structure.

The present invention obviates these difficulties by providing a durable beading strip which has the resilient properties of sponge rubber and is tough and impervious to moisture and capable of being securely anchored in position. This is accomplished, according to the present invention, by a bead of sponge rubber or the like having a resilient bendable attaching flange and the whole enclosed and sealed with a tough, impervious cover secured throughout the surface thereof. In the preferred form of the invention, the bead has at least one flat surface to which is secured the attaching strip or flange. The flange is provided with a plurality of interstices and/or loops along one edge thereof and the rubber of the bead extends into the interstices and the loops and interlocks therewith.

In order to make the strip impervious to moisture, the present invention completely encloses the bead and flange with a tough, resilient cover which is securely and integrally bonded to the surface so as to be a part thereof. The cover may be a coating of said material, a deposit from a dispersion of latex, or may be preformed, as by extrusion, and secured to the bead and flange.

In some installations, the beading strip will not be exposed to the weather, and, in such cases, it may be covered with a textile covering material securely anchored thereon.

A feature of the present invention is the novel method of making beading strips having the attaching flange secured to one face thereof.

Other features and advantages of the invention will become apparent when considered in connection with the drawing, in which.

Figure 1:
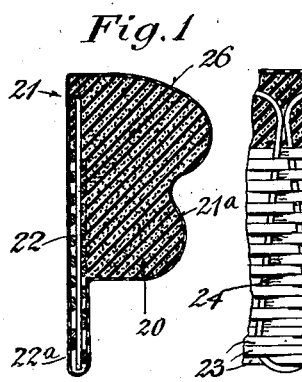
Figure 1 shows a transverse sectional view of one form of the bead of the present invention.
Figure 2:
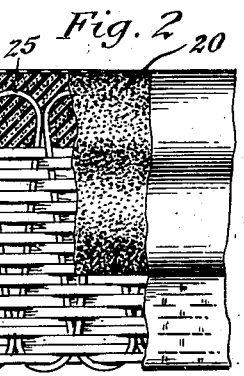
Fig. 2 shows a front view, partly in section, of the form of the invention shown in Fig. 1.

The seal of the present invention comprises a solid bead 20 of flexible resilient material, preferably sponge rubber.

The bead has at least one substantially flat surface 21 and a contacting face 21a. An attaching strip or flange 22 of bendable resilient material is secured to the surface 21 to extend thereover.

In the illustrated form of the invention, the attaching flange comprises textile warps 23 and bendable resilient wefts 24 extending therethrough and projecting beyond one edge thereof to form a plurality of loops 25.

As is shown in Fig. 1, the bead material enters into the interstices of one face of the woven attaching flange and also passes through and interlocks with the loops at the edge of the flange, so that the flange is securely anchored to and overlies the flat surface of the bead.

A portion 22a of the flange extends below the bottom of the bead and forms the means for mounting and attaching the bead in position, as will be explained.

While the shape of the bead may be varied as desired, it is herein illustrated as having a contour which is substantially B-shaped, and the attaching flange is secured to the back of the bead. The bead and flange are provided with a cover of tough, impervious, flexible material, and may be treated with a suitable bonding agent or compound, if necessary, in order to cause the cover material to adhere throughout the surface thereof.

In the form of the invention shown in Fig. 1, the bead and flange are impregnated with a suitable bonding compound and the cover is then formed by depositing a thin layer 26 directly thereon from a dispersion of latex. This provides a very thin skin over the sponge rubber bead and the attaching flange and seals them against the entry of any moisture. The cover, being bonded throughout the surface of the bead and flange, becomes, in effect, a part thereof and bends and yields with the bead and flange without any bunching.

Figure 9:
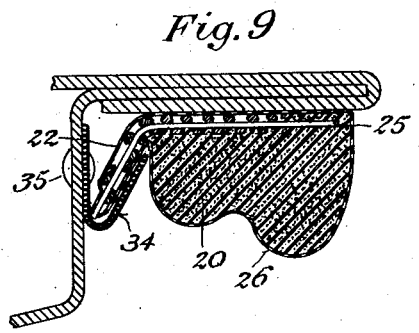
Fig. 9 shows a detail sectional view of the door with the seal partially installed.
Figure 8:
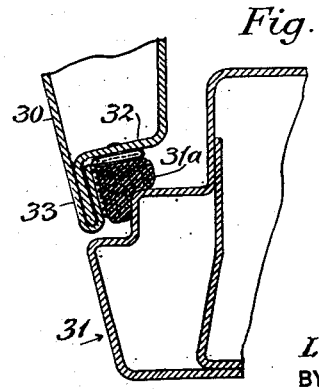
Fig. 8 shows a partial sectional view of the door and door jamb having the seal of the present invention thereon.

While the seal of the present invention may be used with closures of various types, it is herein illustrated, in Figs. 8 and 9, as applied between an automobile door 30 and a jamb 31 therefor.

The door, as is best shown in Fig. 8, is provided with an edge portion 32 and an outwardly extending flange 33 which overlies and cooperates with a shoulder 31a on the jamb to close the opening defined thereby.

The outer seal is mounted in the corner formed between the edge and the flange, with its contact face 21a in position to engage and cooperate with the shoulder on the jamb to seal the opening therebetween. It is held in this position by an attaching means which may comprise the usual clip passing through apertures in the flange and door edge, a series of individual clamps, or a channel-shaped member 34, as shown in Fig. 9, secured by riveting, welding, or the like 35 to the edge of the door adjacent the base of the flange. In mounting the outer seal, the projecting portion 22a of the attaching flange is inserted into the opened channel, as shown in Fig. 9. The channel is then closed into the position in which it grips the projecting flange and clamps it to the edge of the door. In doing this, the projecting portion of the flange is bent and the flat bottom of the B-shaped portion of the bead moves into position, shown in Fig. 8, wherein it overlies and completely conceals the attaching member 34.

As the attaching flange is bent, its resiliency will cause the flat back portion 21 to be urged into and maintained in tight engagement with the projecting flange on the door.

Figure 4:
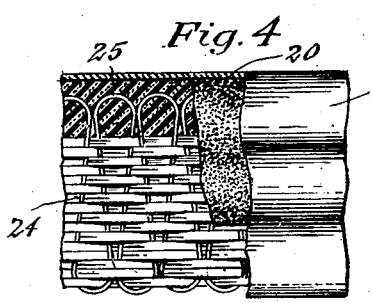
Fig. 4 is a view similar to Fig. 2, showing the elements of the form of the invention shown in Fig. 3.
Figure 3:
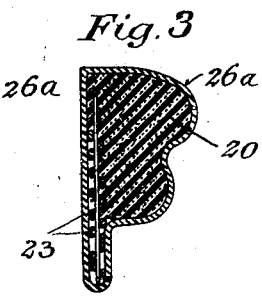
Fig. 3 is a view similar to Fig. 1, showing another form of my invention embodying a preformed cover.
Figure 5:
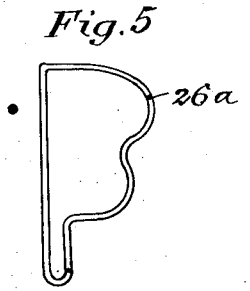
Fig. 5 shows an end view of the preformed cover.

If the seal is to be subjected to severe wear, the heavy duty seal of the present invention, as shown in Figs. 3 through 5, may be employed. In this form of the invention, the bead and attaching strip are as previously described, but the cover comprises a heavy layer 26a of rubber or the like material. The cover is preformed to the shape of the exterior of the bead and flange, as shown in Fig. 5 by extruding or molding it.

The bead and flange may be provided with a suitable adhesive or bonding agent and the cover assembled thereon and secured to the surface thereof, or the cover may be extruded directly on the bead and flange and vulcanized directly thereto.

This cover completely encloses and seals the strip and adheres to the entire surface of the bead and flange to flex therewith. Since the cover is preformed to the shape of the core, it will be devoid of internal stresses which would be produced if the cover was folded up from a flat sheet of rubber material and will, consequently, yield with the strip without undue bunching or buckling during the installation and use thereof.

Figure 7:
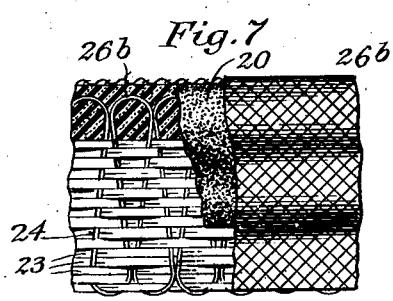
Fig. 7 is a view similar to Fig. 2 of the form of the invention shown in Fig. 6.
Figure 6:
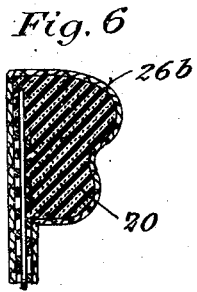
Fig. 6 is a view similar to Fig. 1, showing another form of the invention embodying a fabric cover.

Under some circumstances, the strip may be used as an interior seal or for decorative purposes and will not be subject to weather conditions. In this case, it can be covered with a textile fabric 26b or the like, as shown in Figs. 6 and 7, which may be cemented, stitched or otherwise secured in position therearound.

While the cover materials have been indicated as being of latex, rubber and fabric, it is to be understood that other suitable synthetic rubbers, resins or compositions, which produce a flexible, impervious layer, may be substituted therefor.

Figure 10:
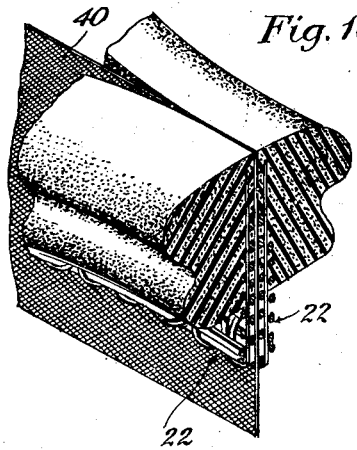
Fig. 10 shows a view of the strips showing the process of making the same.

In making up the beading strips of the present invention, two beads may be formed at the same time. To do this, a novel method is employed, wherein a separator strip of Holland cloth 40 or other suitable material, to which rubber does not readily adhere, has assembled on each side thereof an attaching flange 22 as shown in Fig. 10. The bead is then molded about the top of the assembled strips so as to extend the same amount on each side of the separator strip and be symmetric with respect thereto. The rubber will extend through the loops of the flanges and interlock with and cover the same, but the separator strip will protect one side of the flange and keep it free from rubber.

After the bead has been completely molded and cured, the separator strip is removed by a stripping or peeling operation, leaving a flat surface including the uncovered portion of the flange.

The foregoing can be accomplished with strips of predetermined length or in a continuous process wherein a continuous separator strip is associated with continuous lengths of attaching flange material and the assembly passed through a continuous molding machine which will form the beads thereon.

After the beads and attaching flanges are separated, they may be provided with the cover if desired. In doing this, they are treated with a bonding agent or adhesive, if necessary, and the cover formed thereabout, by coating, depositing a layer of latex thereon from a dispersion thereof, or securing a fabric therearound, as required.

Variations and modifications may be made within the scope of this invention and portions of the improvements may be used without others.

I claim:

1. A weather strip comprising a bead of sponge rubber having a B-shaped outer surface, one lobe of the B projecting beyond the other to provide an initial sealing contact surface; an attaching flange secured to the back of the B and extending below the bottom surface; and a cover extending around the bead and attaching flange.

2. An outer seal comprising a bead of sponge rubber having a B-shaped outer surface, an attaching flange secured to the back of the B and extending below the bottom surface, the space between the lobes of the B being curved and providing an edge-receiving surface; and a cover of tough, resilient material impervious to moisture extending around the bead and attaching flange and secured thereto to seal the same.

3. A weather strip comprising a bead of sponge rubber having a B-shaped outer surface, the lobes of the B extending outwardly different extents to provide stepped sealing surfaces; an attaching flange secured to the back of the B and extending below the bottom surface; and a preformed cover of rubber secured thereto and enclosing the bead and attaching flange to completely seal the strip.

4. A beading strip comprising a bead of sponge rubber having a B-shaped outer surface, the lobes of the B extending outwardly different extents to provide stepped sealing surfaces; an attaching flange secured to the back of the B and extending below the bottom surface; and a cover of fabric extending around the bead and attaching flange and secured thereto.

5. A weather strip comprising a bead of sponge rubber having a B-shaped outer surface, the lobes of the B extending outwardly different extents to provide stepped sealing surfaces; an attaching flange secured to the back of the B and extending below the bottom surface, the bead and attaching flange being impregnated with a bonding compound; and a thin, impervious coating of tough, resilient, flexible material bonded to and completely covering and sealing said strip.

6. A weather strip comprising a bead of sponge rubber having a B-shaped outer surface, the lobes of the B extending outwardly different extents to provide stepped sealing surfaces; an attaching flange of woven material secured to the back of the B and extending below the bottom surface, the bead material extending into the interstices of the woven flange and interlocking therewith; and a cover extending around the bead and attaching flange.

7. A weather strip comprising a bead of sponge rubber having a B-shaped outer surface, the lobes of the B extending outwardly different extents to provide stepped sealing surfaces; an attaching flange of stiff woven material disposed over the back of the B and extending below the bottom surface, the bead material extending into the interstices of the woven flange and interlocking therewith, the bead and attaching flange being impregnated with a bonding compound; and a thin, impervious coating of tough, resilient, flexible material bonded to and completely covering and sealing said strip.

8. A sealing means for a closure member having a flange extending beyond the edge thereof and anchoring means on the edge adjacent the base of the flange comprising a bead of sponge rubber having a pair of flat surfaces to engage the edge and flange respectively; an attaching strip of bendable resilient material extending over and secured to one of the flat surfaces and extending below the other; and a cover of resilient material enclosing the bead and attaching strip, said attaching strip being anchored to the edge by the anchoring means and bent at the edge of the bead to cause the other flat surface to overlie the attached strip and cover the attaching means, the resilient attaching strip forcing the first flat surface into engagement with the flange.

9. A sealing means for a closure member having a flange extending beyond the edge thereof to cooperate with an edge of an opening and anchoring means on the edge adjacent the base of the flange comprising a bead of sponge rubber having a pair of surfaces to engage the edge and flange respectively and an opening-edge engaging surface; and an attaching strip of bendable resilient material extending over and secured to one of the surfaces and extending below the other, said strip being anchored to the edge by the anchoring means and bent at the edge of the bead to cause the other surface to overlie the same and cover the attaching means, the resilient attaching strip forcing the first surface into engagement with the flange and holding the opening-edge engaging surface in position to cooperate therewith when the closure member is moved to closed position.

10. An external seal for an automobile door or the like having a flange extending beyond the edge thereof to cooperate with a jamb or the like and anchoring means on the edge of the door adjacent the base of the flange comprising a bead of sponge rubber having a pair of flat surfaces to engage the edge and flange respectively and a jamb-contacting surface; and an attaching strip of bendable resilient material extending over and secured to one of the flat surfaces and extending below the other, said strip being anchored to the door by the anchoring means and bent at the edge of the bead to cause the other flat surface to overlie the strip and cover the attaching means, the resilient attaching strip forcing the first flat surface into engagement with the flange.

LOUIS SPRARAGEN.